US012771810B2

(12) United States Patent
Chen et al.

(10) Patent No.: US 12,771,810 B2
(45) Date of Patent: Oct. 20, 2026

(54) PROJECTION SYSTEM AND PROJECTION METHOD

(71) Applicant: Coretronic Corporation, Hsin-Chu (TW)

(72) Inventors: Chih-Chen Chen, Hsin-Chu (TW); Hui-Chung Hung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 19/245,429

(22) Filed: Jun. 23, 2025

(65) Prior Publication Data

US 2026/0012558 A1 Jan. 8, 2026

Related U.S. Application Data

(60) Provisional application No. 63/667,822, filed on Jul. 5, 2024.

(30) Foreign Application Priority Data

Sep. 26, 2024 (CN) ......................... 202411349496.3

(51) Int. Cl.
*G06F 3/038* (2013.01)
*G06T 7/70* (2017.01)
(Continued)

(52) U.S. Cl.
CPC ............... *H04N 9/31* (2013.01); *G06F 3/038* (2013.01); *G06T 7/70* (2017.01); *G06V 20/00* (2022.01);
(Continued)

(58) Field of Classification Search
CPC ........ G06V 20/00; H04N 9/31; H04N 9/3179; H04N 9/3194; G06F 3/038; G06F 3/167;
(Continued)

(56) References Cited

U.S. PATENT DOCUMENTS 7,090,134 B2 * 8/2006 Ramsager ................. B07C 3/20 235/462.13
10,991,461 B2 * 4/2021 Divine ................... G16H 40/20
(Continued)

FOREIGN PATENT DOCUMENTS

CN 118158371 6/2024
TW I863702 11/2024

OTHER PUBLICATIONS

Chih-Yi Chung et al., "Projection System, Projection Apparatus and Method of Controlling Projection Apparatus", Unpublished Taiwan application No. 113104849, Filed on Feb. 7, 2024.

*Primary Examiner* — Olga V Merkoulova
(74) *Attorney, Agent, or Firm* — JCIPRNET

(57) ABSTRACT

A projection system and a projection method are provided. The projection system includes a projection module, an image capture apparatus, an input apparatus, and a processor. The processor is configured to: receive an input signal from the input apparatus and generate an input command accordingly; drive the image capture apparatus to obtain a target captured image, where the target captured image includes a target image corresponding to a target object; transmit the target captured image and the input command to a cloud server; receive an analysis result generated by an artificial intelligence computing module according to the input command and the target image from the cloud server; determine display information according to the analysis result, and calculate a display position of the display information within a projection range; and drive the projection module to project an information image with display information.

32 Claims, 8 Drawing Sheets

(51) Int. Cl.
*G06V 20/00* (2022.01)
*H04N 9/31* (2006.01)
*G06F 3/16* (2006.01)

(52) U.S. Cl.
CPC ...... *G06F 3/167* (2013.01); *G06F 2203/0384* (2013.01)

(58) Field of Classification Search
CPC . G06F 2203/0384; G06T 7/0002; G06T 7/70; G06T 2207/30128
See application file for complete search history.

(56) References Cited

U.S. PATENT DOCUMENTS

| | | | | |
|---|---|---|---|---|
| 11,666,825 | B2 * | 6/2023 | Delamont | A63F 13/21 463/32 |
| 2004/0195320 | A1 * | 10/2004 | Ramsager | B07C 3/18 235/385 |
| 2019/0362556 | A1 * | 11/2019 | Ben-Dor | G06F 3/167 |
| 2020/0368616 | A1 * | 11/2020 | Delamont | A63F 13/21 |
| 2022/0351475 | A1 * | 11/2022 | Ben-Dor | G06F 3/013 |

* cited by examiner

PROJECTION SYSTEM AND PROJECTION METHOD

CROSS-REFERENCE TO RELATED APPLICATION

This application claims the priority benefit of U.S. provisional application Ser. No. 63/667,822, filed on Jul. 5, 2024 and China application serial no. 202411349496.3, filed on Sep. 26, 2024. The entirety of the above-mentioned patent applications is hereby incorporated by reference herein and made a part of this specification.

BACKGROUND

Technical Field

The disclosure relates to a projection mechanism that interacts with an artificial intelligence module, and in particular to a projection system and a projection method.

Description of Related Art

With the development of projection technology, projectors may be utilized in different venues and spaces. Additionally, with the advent of artificial intelligence (AI), both content-generating technology and identification technology may be integrated with the projectors by AI models, allowing for applications in many venues and spaces.

Currently, the integration of the AI models with the projectors is mostly applied in scenarios where the AI models are configured to set or operate internal functions of the projectors, such as turning on and off or adjusting a color mode. However, in the integration of identification-type AI models and content-generating AI models with projectors, the smart home functions of the projectors have not been upgraded.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

Other objectives, features and advantages of the present invention will be further understood from the further technological features disclosed by the embodiments of the present invention wherein there are shown and described preferred embodiments of this invention, simply by way of illustration of modes best suited to carry out the invention.

The disclosure provides a projection system and a projection method which can project and display target information corresponding to a target object around the target object in real-time.

Other objectives and advantages of the disclosure may be further understood from the technical features disclosed in the disclosure.

To achieve one or part or all of the aforementioned objectives or other objectives, a projection system of the disclosure, adaptable for being communicatively connected to a cloud server, where the cloud server has an artificial intelligence (AI) computation module, includes: a projection module, an input apparatus, a processor, and an image capture apparatus. The processor is connected to the projection module, the image capture apparatus, and the input apparatus. The processor is configured to: receive at least one input signal from the input apparatus, and generate an input command according to the input signal; drive the image capture apparatus to capture an image towards a target environment space having a target object after receiving the input signal to obtain a target captured image, where the target captured image includes a target image corresponding to the target object; transmit the target captured image and the input command to the cloud server after receiving the target captured image; receive an analysis result from the cloud server, where the analysis result includes target information corresponding to the target object, and is generated by the AI computation module according to the input command and the target image; determine display information according to the analysis result, and calculate a display position of the display information within the projection range, where the display information includes the target information; and drive the projection module to project an information image with the display information towards the target environment space.

A projection method of the disclosure is applicable to a projection system and a cloud server communicatively connected to the projection system. The projection system includes a projection module, an image capture apparatus, an input apparatus, and a processor. The processor is connected to the projection module, the image capture apparatus, and the input apparatus, and the cloud server has an AI computation module. The projection method includes the following steps executed by the processor: receiving at least one input signal from the input apparatus, and generating an input command according to the input signal; driving the image capture apparatus to capture perform image capturing towards a target environment space having a target object after receiving the input signal to obtain a target captured image, where the target captured image includes a target image corresponding to the target object; transmitting the target captured image and the input command to the cloud server after receiving the target captured image; receiving an analysis result from the cloud server, where the analysis result includes target information corresponding to the target object and is generated by the AI computation module according to the input command and the target image; determining display information according to the analysis result, and calculating a display position of the display information within a projection range, where the display information includes the target information; and driving the projection module to project an information image with the display information towards the target environment space.

Based on the above, the disclosure provides the projection system having the image capture apparatus and the projection module, which cooperates with the AI computation module located in the cloud to perform AI computation, and identifies target objects such as objects or text in the image captured by the image capture apparatus of the projection system. After the target information of the target object is recognized by the AI computation module, the target information is projected and displayed in real-time next to the actual target object by the projection module, which may be convenient for the user to view.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted", and variations thereof herein are used broadly and encompass direct and indirect connections, couplings, and mountings.

The aforementioned and other technical content, features, and effects of the present invention are clearly presented in the following detailed description of a preferred embodiment with reference to the accompanying drawings. The directional terms mentioned in the following embodiments, such as: up, down, left, right, front or back, etc., are only referenced to the directions in the accompanying drawings. Therefore, the directional terms used are for description and not for limiting the present invention.

Figure 1:
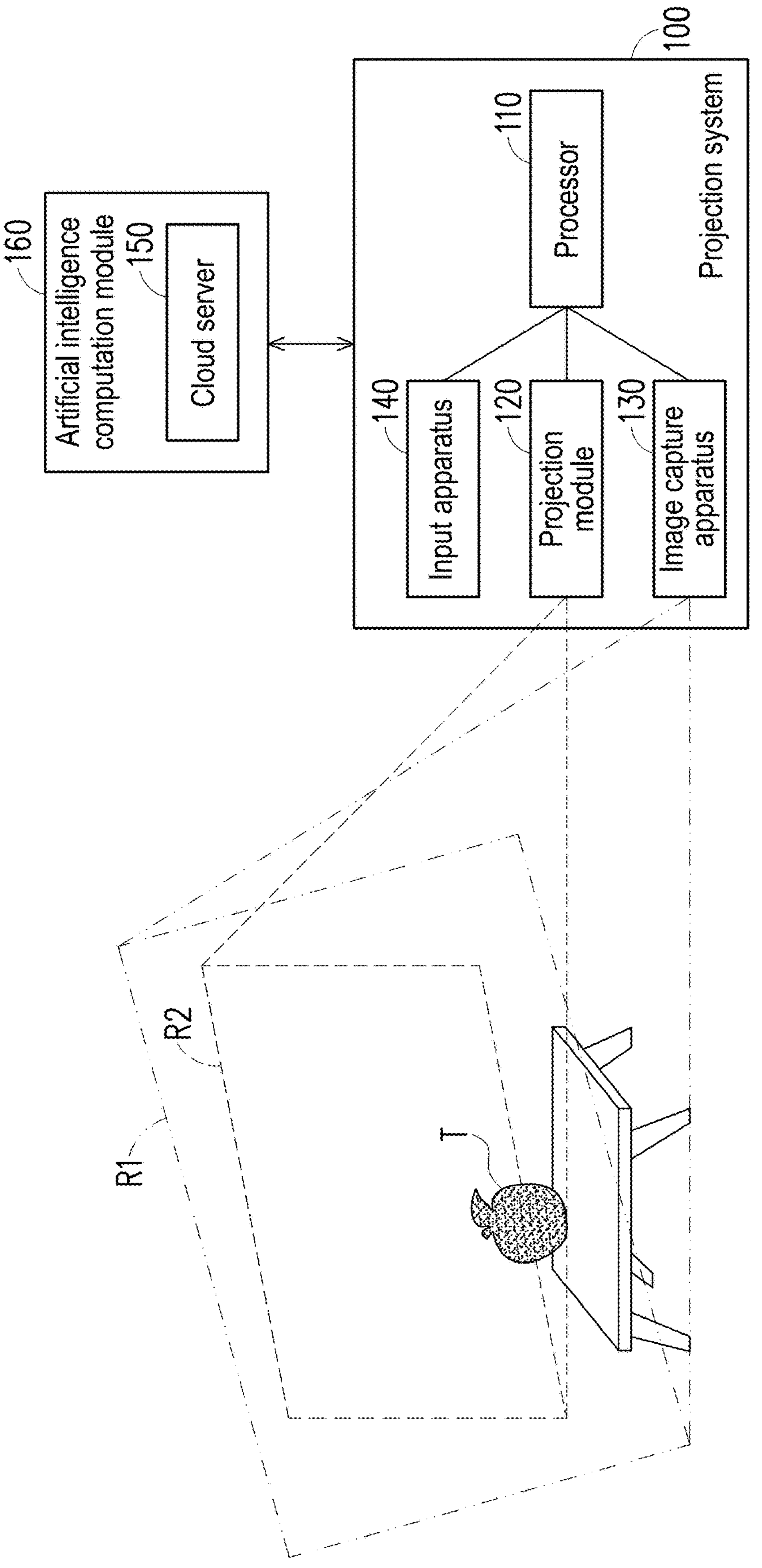
FIG. 1 is a schematic diagram of an application scenario of a projection system according to the first embodiment of the disclosure.

FIG. 1 is a schematic diagram of an application scenario of a projection system according to the first embodiment of the disclosure. In this embodiment, a projection system 100, coupled with an artificial intelligence (AI) computation module 160, identifies a target object T in the actual space, computes target information applicable to the target object T at the moment, and projects the target information in real-time around the target object T in the actual space. The AI computation module 160 is disposed in a cloud server 150.

With reference to FIG. 1, the projection system 100 includes a processor 110, a projection module 120, an image capture apparatus 130, and an input apparatus 140. The processor 110 is coupled to the projection module 120, the image capture apparatus 130, and the input apparatus 140. The number of processors 110 may be one or multiple. For convenience, only one processor 110 is illustrated here. The coupling is, for example, a connection of electrical signals.

The processor 110 may adopt a central processing unit (CPU), a physics processing unit (PPU), a programmable microprocessor, an embedded control chip, a digital signal processor (DSP), an application specific integrated circuits (ASIC), a field programmable gate array (FPGA), a digital data processor (DDP), a digital controller, or other similar apparatuses.

The projection module 120 is configured to receive image data from the processor 110, and projects the image data onto a projection target such as a screen, a desktop, or a wall to form a projected image. The projection module 120 includes components such as an imaging element (for example, a light valve), a projection lens, a light source, an optical element (for example, including a reflector, a beam splitter, a lens, and so on) for transmitting light beams, where the light source may include a light emitting diode (LED), a laser diode (LD), or a combination thereof. The imaging element (for example, the light valve) may be a reflective optical modulator such as a liquid crystal on silicon panel (LCoS panel) or a digital micro-mirror device (DMD). In some embodiments, the imaging element (for example, the light valve) may also be a transmissive optical modulator such as a transparent liquid crystal panel, an electro-optical modulator, a magneto-optic modulator, or an acousto-optic modulator (AOM).

The image capture apparatus 130 may, for example, adopt a camera or a video camera using a charge coupled device (CCD) lens or a complementary metal oxide semiconductor transistor (CMOS) lens. The image capture apparatus 130 may be disposed inside a projector. Alternatively, the image capture apparatus 130 may also be another independent apparatus different from the projector, and may be configured to be connected to the projector externally, but is not limited to thereto.

In this embodiment, the input apparatus 140 is configured to receive an input operation of a user and generate a corresponding input signal accordingly. The input apparatus 140 may be electrically connected to the processor 110, or may communicatively connected to the processor 110 through the communication module to send the input signal to the processor 110. The input apparatus 140 may be, for example, a voice receiver (a microphone) configured to receive the voice of the user as a voice input signal. Alternatively, in another embodiment, the input apparatus 140 may be an infrared remote control apparatus. When the projection module 120 projects a virtual keyboard image, the input signal may be generated by receiving the input operation of the user via an operation of the infrared remote control apparatus. In other embodiments, the input apparatus 140 may be a portable smart device, which displays an input interface on a display of a portable smart device by an application of the portable smart device, thereby generating an input signal by the input operation of the user. Additionally, in other embodiments, the projection system 100 may also include multiple input apparatuses 140, which is not limited thereto.

In this embodiment, the processor 110 may have a built-in communication module to perform a network transmission function by the communication module. The communication module may, for example, use a technology such as a wireless local area network (WLAN) communication technology, a Wi-Fi communication technology, a bluetooth communication technology, a near-field communication (NFC) technology, or an infrared (IR) communication technology.

In this embodiment, the image capture apparatus 130 is configured to obtain a target captured image, and in conjunction with the AI computation module 160 located in the cloud server 150 to identify the target object T within a capture range R1 of the target captured image, thereby obtaining target information applicable to the target object T, and then driving the projection module 120 to project an information image including the target information within a projection range R2. For example, the projection module 120 may project and display the information image next to the target object T in real-time. Here, the capture range R1 of the image capture apparatus 130 and the corresponding projection range R2 of the projection module 120 have partial or complete overlap. Accordingly, it may be clearly known where to project the target information (display information) to a position adjacent to the target object T.

The projection system 100 may include a storage coupled to the processor 110 or the processor 110 may have a built-in storage. In an embodiment, a coordinate relationship between the capture range R1 of the image capture apparatus 130 and the projection range R2 of the projection module 120 may be pre-stored in the storage, that is, the coordinate relationship obtained after the coordinate conversion between the two ranges is pre-calculated. In another embodiment, when the projection system 100 is first started, the capture range R1 of the image capture apparatus 130 and the projection range R2 of the projection module 120 may be calibrated to obtain the coordinate relationship between the capture range R1 and the projection range R2, and the coordinate relationship is stored in the storage of the projection system 100.

Figure 2:
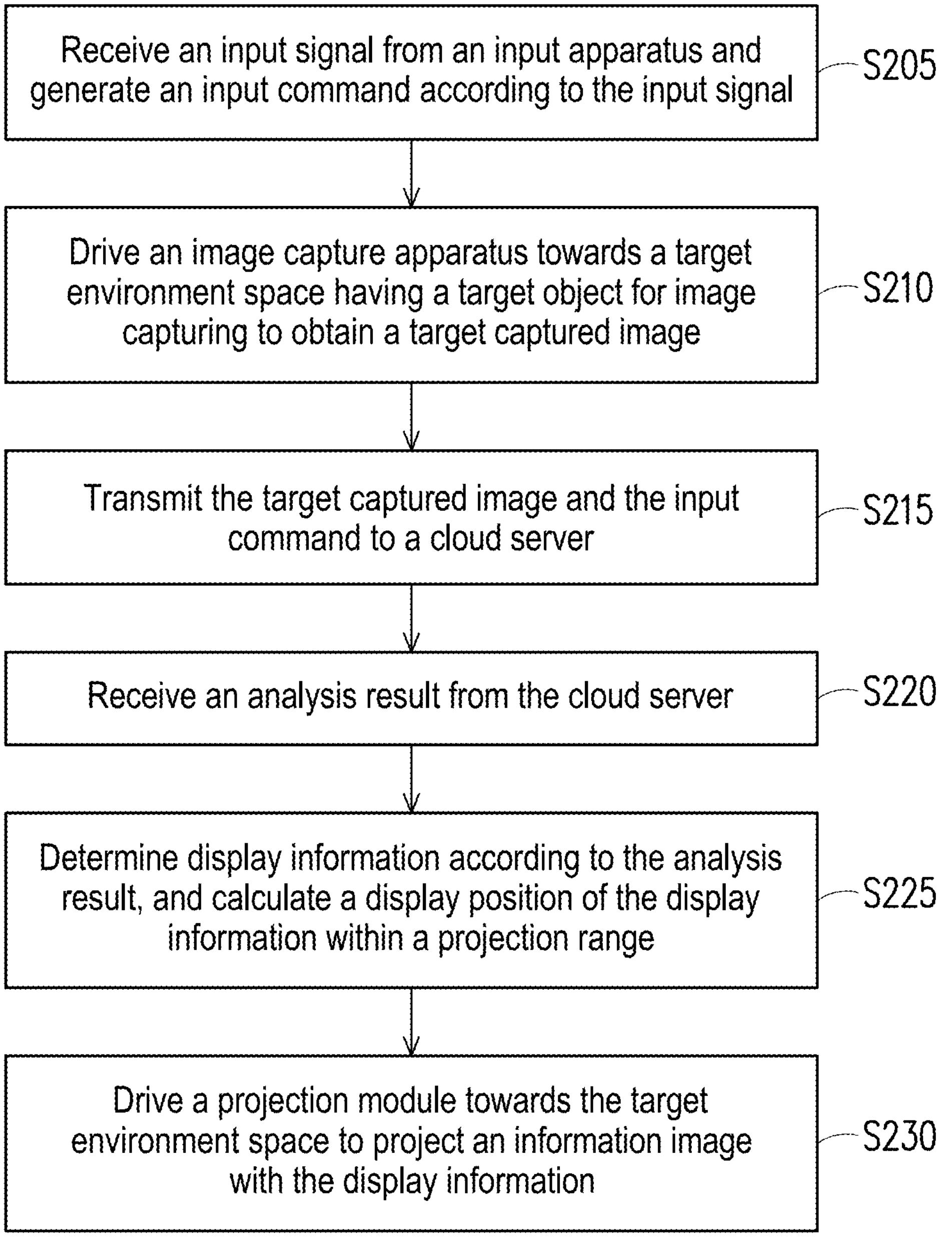
FIG. 2 is a flowchart of a projection method according to the first embodiment of the disclosure.

FIG. 2 is a flowchart of a projection method according to the first embodiment of the disclosure. With references to FIG. 1 and FIG. 2, in Step S205, the processor 110 receives an input signal from the input apparatus 140 and generates an input command according to the input signal. Then, after receiving the input signal, in Step S210, the processor 110 drives the image capture apparatus 130 to capture an image towards a target environment space having the target object T, and obtains a target captured image. Here, the target captured image includes a target image corresponding to the target object T.

After the processor 110 receives the target captured image, in Step S215, the processor 110 transmits the target captured image and the input command to the cloud server 150. Next, in Step S220, the processor 110 receives an analysis result from the cloud server 150. Here, the analysis result includes target information corresponding to the target object T. The analysis result is generated by the AI computation module 160 according to the input command and the target image of the target captured image.

In an embodiment, the cloud server 150 performs image recognition on the target captured image by the AI computation module 160 according to the input command to obtain the target image corresponding to the target object T. Next, a look-up is performed, and the target information corresponding to the target object T is automatically generated according to the input command. Here, the AI computation module 160 is an AI model with support for image recognition. For example, the AI computation module 160 may implement the embodiments by a large language model that supports the image recognition such as chat generative pre-trained Transformer (ChatGPT), Google Gemini, or Claude, but is only for illustration and is not limited thereto.

The input command serves as a prompt for the AI computation module 160. The AI computation module 160 identifies the target object T (for example, a physical object) corresponding to the target image from the target captured image according to the input command (the prompt), and generates an analysis result after further AI computation on the target object T. The analysis result includes the target information such as a type, size, appearance, recipe, or nutritional value of the target object T. A presentation of the target information may be in a text format or voice signal, or may be presented in both text format and voice signal at the same time. The cloud server 150 transmits the analysis result back to the projection system 100.

In Step S225, the processor 110 determines display information according to the analysis result, and calculates a display position of the display information within the projection range R2. For example, after performing the image recognition on the target captured image by the AI computation module 160 according to the input command, the cloud server 150 may obtain the target image corresponding to the target object T of the target captured image and the coordinate information of the target image (for example, the coordinates of the four corners of the target image), and encapsulate the coordinate information of the target image into the analysis result to be transmitted to the projection system 100. Accordingly, the processor 110 may determine the display position of the display information within the projection range R2 according to the coordinate information of the target image.

In an embodiment, the processor 110 in the projection system 100 pre-stores the coordinate relationship between the capture range R1 of the image capture apparatus 130 and the projection range R2. For example, the projection system 100 includes a storage, which pre-stores the coordinate relationship between the capture range R1 and the projection range R2. The processor 110 may read the coordinate relationship between the capture range R1 and the projection range R2 from the storage, and calculates a coordinate position of the target image of the target captured image within the projection range R2 based on the coordinate relationship. Moreover, the processor 110 determines the display position of the display information in the projection range R2 according to the coordinate position and the analysis result. Here, the target object T and the display information on the projected information image have an adjacent configuration relationship in the target environment space.

The processor 110 may calculate the first coordinate information of the target object T in the capture range R1 according to the analysis result returned from the cloud server 150. The first coordinate information, for example, may be the coordinate positions P1, P2, P3, P4 of the four corners of the target image corresponding to the target object T relative to the capture range R1. Next, the processor 110 calculates the second coordinate information of the target image (corresponding to the target object T) within the projection range R2 based on the coordinate relationship between the capture range R1 and the projection range R2. For example, based on the coordinate relationship, the four coordinate positions P1, P2, P3, P4 of the capture range R1 are converted to four coordinate positions P1', P2', P3', P4' of the projection range R2. The second coordinate information includes the coordinate positions P1', P2', P3', P4'. Subsequently, the processor 110 may determine the display position of the display information within the projection range R2 according to the second coordinate information within the projection range R2.

In Step S230, the processor 110 drives the projection module 120 to project an information image with display information towards the target environment space. In an embodiment, the display information may only include the target information. In another embodiment, the analysis result includes the target information and an object image corresponding to the target object T. The object image may be an AI-synthesized image generated by the AI computation module 160, or an image searched by the AI computation module 160 from publicly available sources on the network.

Figure 3:
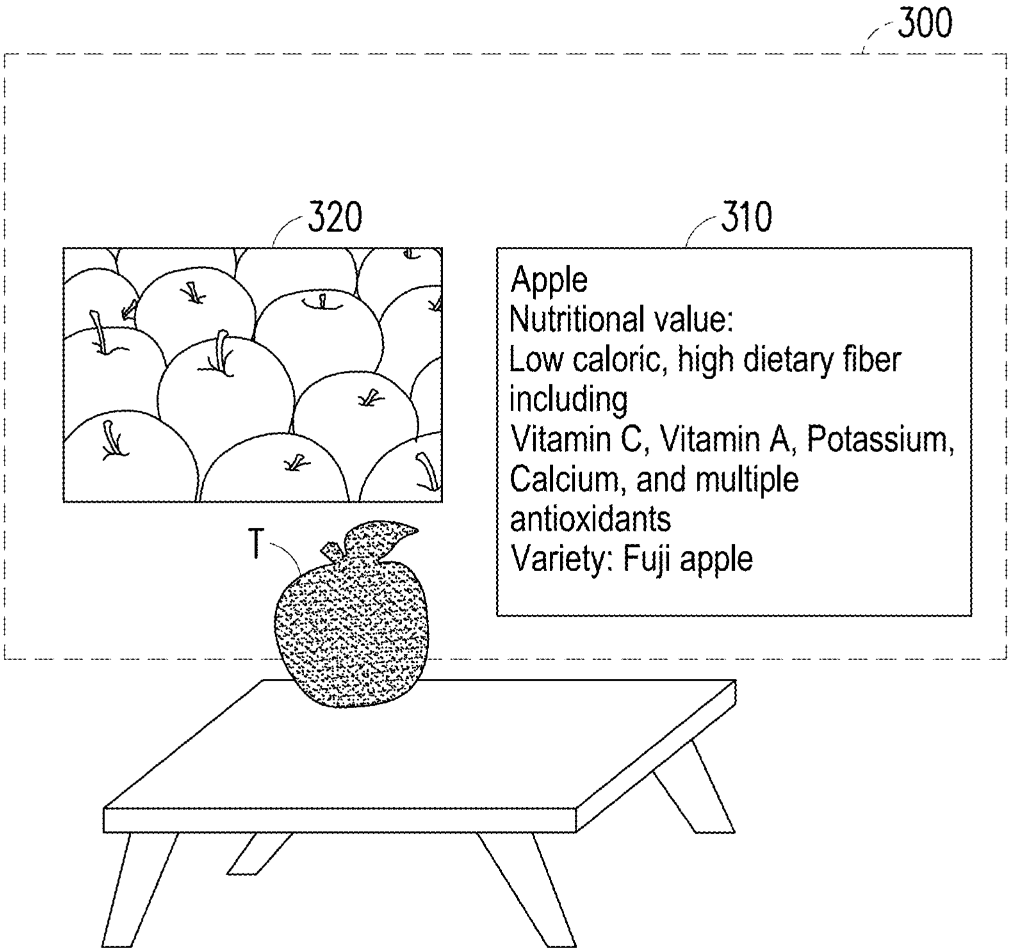
FIG. 3 is a schematic diagram of projecting an information image according to the first embodiment of the disclosure.

FIG. 3 is a schematic diagram of projecting an information image according to the first embodiment of the disclosure. With reference to FIG. 3, the display information on an information image 300 includes target information 310 and an object image 320. As shown in FIG. 3, the target information 310 and the object image 320 are located around the target object T. That is, the target object 310 and the display information 310 on the projected information image 300 have an adjacent configuration relationship in the target environment space.

Figure 4:
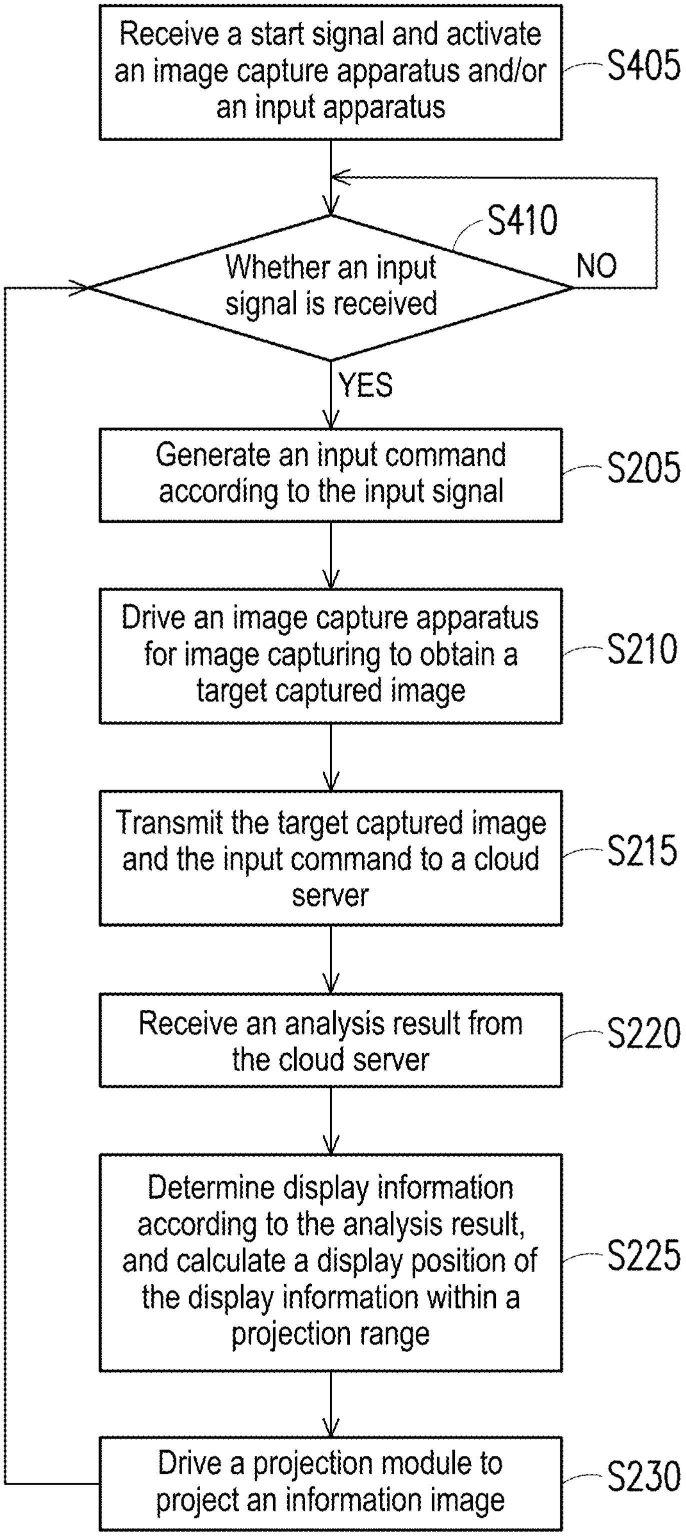
FIG. 4 is a flowchart of an overall operation of the projection system according to the first embodiment of the disclosure.

FIG. 4 is a flowchart of an overall operation of the projection system according to the first embodiment of the disclosure. This embodiment is an application example based on Steps S205 to S230 of FIG. 2. Please refer to FIG. 1 and FIG. 4. In Step S405, the processor 110 receives a start signal and activates the image capture apparatus 130 and/or the input apparatus 140 in response to the start signal. For example, the start signal may come from the operation of the input interface of the portable smart device, thereby making the processor 110 activate the image capture apparatus 130 and/or the input apparatus 140 (the microphone). Alternatively, the start signal may come from a button on an infrared remote control apparatus, thereby activating the image capture apparatus 130 and/or the input apparatus 140 (the microphone) corresponding to the operation of the user on the button. Or, the start signal may come from a physical button disposed on a projector housing where the projection module 120 is located, thereby activating the image capture apparatus 130 and/or the input apparatus 140 (the microphone) corresponding to the operation of the user on the physical button.

In Step S410, the processor 110 determines whether the input signal is received. After the input signal is received, Steps S205 to S230 are executed. After the information image is projected, the process returns to Step S410 where the processor 110 continues to determine whether another input signal is received. If the determination is yes, Steps S205 to S230 are continued. If the determination is that no other input signal is received, which means no further identification is performed, the process returns to before Step S410.

In an embodiment, the processor 110 and the projection module 120 may be disposed inside a projector, while the image capture apparatus 130 and the input apparatus 140 may be disposed inside the projector or externally connected to the projector, depending on the actual application. The second to fifth embodiments are described below for illustration.

Figure 5:
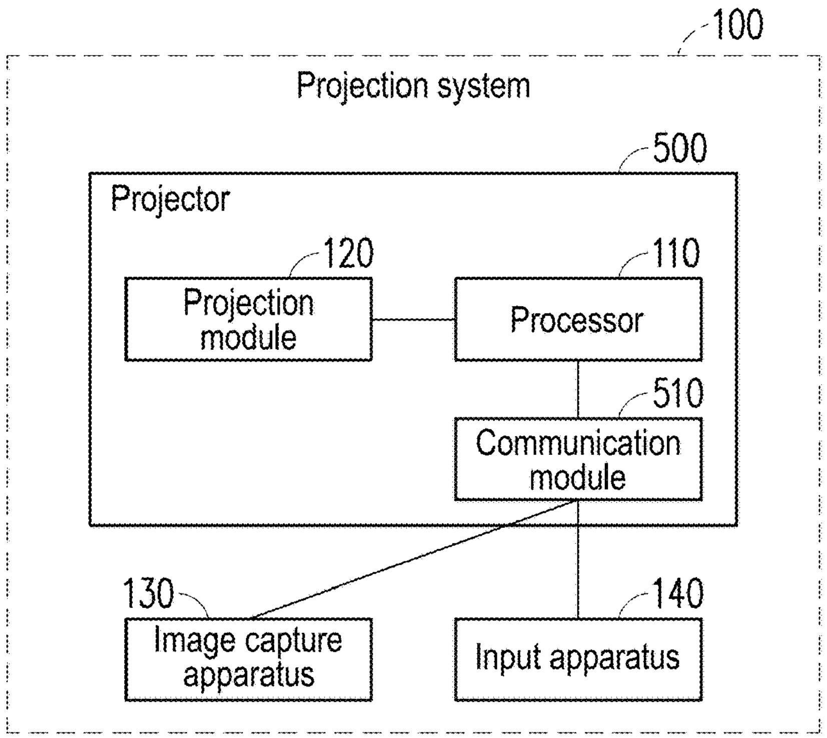
FIG. 5 is a block diagram of a projection system according to the second embodiment of the disclosure.

FIG. 5 is a block diagram of a projection system according to the second embodiment of the disclosure. In FIG. 5, the projection system 100 includes a projector 500 and an image capture apparatus 130 and an input apparatus 140 externally connected to the projector 500. The projector 500 includes a processor 110, a projection module 120, and a communication module 510. In the second embodiment, the communication module 510 is not disposed inside the processor 110, but is disposed in the projector 500 and connected to the processor 110 to perform a network transmission function, but is not limited thereto.

The communication module 510 is coupled to the processor 110 and communicatively connected to the input apparatus 140 and the image capture apparatus 130. The communication module 510 receives the target captured image from the image capture apparatus 130. The communication module 510 receives the input signal from the input module 130. Moreover, the communication module 510 transmits the target captured image and the input signal to the processor 110. The communication module 510 transmits the target captured image and the input command corresponding to the input signal to the cloud server 150.

The communication module 510 may be one or any combination of a bluetooth transmitting and receiving device, a WiFi module, an NFC module, an IR module, a wired communication interface, and a wireless communication interface. The wired communication interface may be implemented by using a universal serial bus (USB) port, a general purpose interface bus (GPIB) port, or a local area network (LAN) port. The wireless communication interface may be implemented by using a WLAN interface, a cellular network communication interface, or a combination thereof.

In an embodiment, the input apparatus 140 is connected to the communication module 510 of the projector 500 in a wireless manner. The input apparatus 140 may be, for example, an infrared remote control apparatus or a portable smart device. The portable smart device may be, for example, an electronic device such as a smartphone, a head-mounted display device, a smart TV, a smartwatch, a tablet computer, an all-in-one computer, or a laptop computer.

In an architecture where the input apparatus 140 is the infrared remote control apparatus, the infrared remote control apparatus is configured to transmit an infrared start signal (as a start signal) to the communication module 510 of the projector 500. The communication module 510 transmits the infrared start signal to the processor 110, and the processor 110 drives the projection module 120 to project a keyboard image with multiple key options, and receives one or multiple infrared control signals (as input signals) from the infrared remote control apparatus. For example, the input apparatus 140 selects one or multiple key options on the keyboard image to generate the infrared control signals correspondingly. The processor 110 generates text content according to the received infrared control signals (the input signals), and generates input commands according to the text content.

In an architecture where the input apparatus 140 is the portable smart device, the portable smart device includes an application corresponding to the projector 500. After this application is opened, the portable smart device correspondingly displays an input interface. By executing input operations on the input interface, at least one wireless control signal (as an input signal) is correspondingly generated. At least one wireless control signal (the input signal) is received by the communication module 510 and transmitted to the processor 110. The processor 110 generates an input command according to the received at least one wireless control signal (the input signal).

Figure 6:
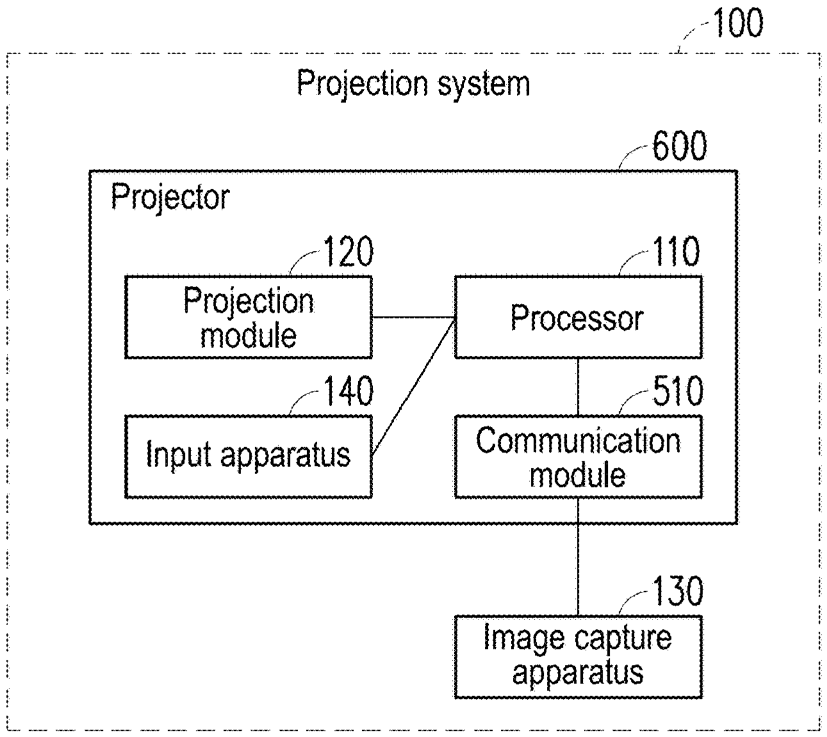
FIG. 6 is a block diagram of a projection system according to the third embodiment of the disclosure.

FIG. 6 is a block diagram of a projection system according to the third embodiment of the disclosure. In FIG. 6, the projection system 100 includes a projector 600 and an image capture apparatus 130 externally connected to the projector 600. The projector 600 includes a processor 110, a projection module 120, an input apparatus 140, and a communication module 510. The communication module 510 is coupled to the processor 110 and the image capture apparatus 130, respectively. The communication module 510 receives a target captured image from the image capture apparatus 130. Moreover, the communication module 510 transmits the target captured image and the input command corresponding to the input signal to the cloud server 150. Here, the input apparatus 140 may be, for example, a voice receiver (a microphone). The voice receiver is configured to receive at least one voice message, where the voice message is the input signal. After receiving at least one voice message, the input apparatus 140 transmits the message to the processor 110. The processor 110 generates the input command according to the received at least one voice message (the input signal).

Figure 7:
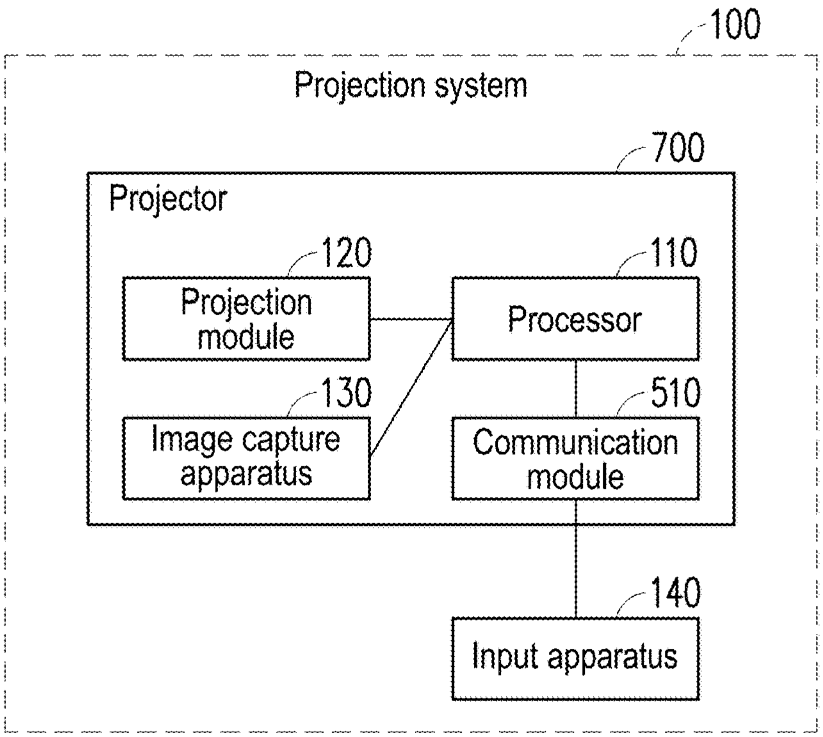
FIG. 7 is a block diagram of a projection system according to the fourth embodiment of the disclosure.

FIG. 7 is a block diagram of a projection system according to the fourth embodiment of the disclosure. In FIG. 7, the projection system 100 includes a projector 700 and an input apparatus 140 externally connected to the projector 700. The projector 700 includes a processor 110, a projection module 120, an image capture apparatus 130, and a communication module 510. The processor 110 is coupled to the projection module 120, the image capture apparatus 130, and the communication module 510, respectively. The communication module 510 transmits the target captured image and the input command corresponding to the input signal to the cloud server 150 (as shown in FIG. 1). In this embodiment, the input apparatus 140 is connected to the communication module 510 of the projector 500 in the wireless manner. The input apparatus 140 may be, for example, an external line remote control apparatus or a portable smart device. Regarding the architecture where the input apparatus 140 is the external line remote control apparatus and the architecture where the input apparatus 140 is the portable smart device, reference may be made to the aforementioned description, which are not repeated here.

Figure 8:
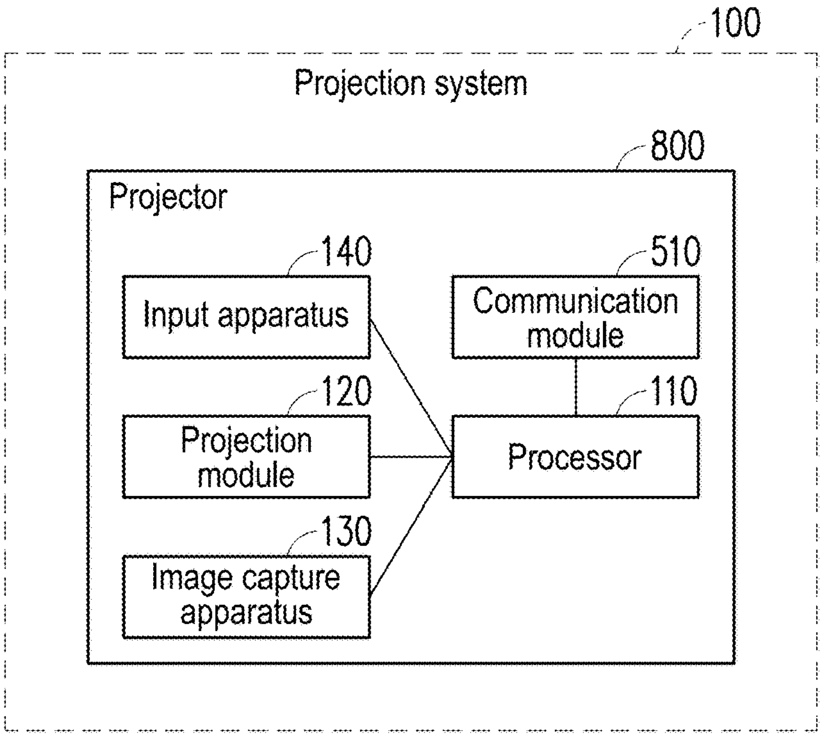
FIG. 8 is a block diagram of a projection system according to the fifth embodiment of the disclosure.

FIG. 8 is a block diagram of a projection system according to the fifth embodiment of the disclosure. In FIG. 8, the projection system 100 includes a projector 800. The projector 800 includes a processor 110, a projection module 120, an image capture apparatus 130, an input apparatus 140, and a communication module 510. The processor 110 is coupled to the projection module 120, the image capture apparatus 130, the input apparatus 140, and the communication module 510, respectively.

In an embodiment, each of the aforementioned projectors 500, 600, 700, and 800 may also include at least one storage. The storage may be implemented by using any type of a fixed or removable random access memory (RAM), read-only memory (ROM), flash memory, hard drive, other similar apparatuses, or a combination thereof. A computer-executable program code is stored in the storage, including one or multiple instructions. The storage is connected to the processor 110, and the processor 110 is configured to execute the one or multiple instructions to implement the steps of the projection method described above.

Figure 9:
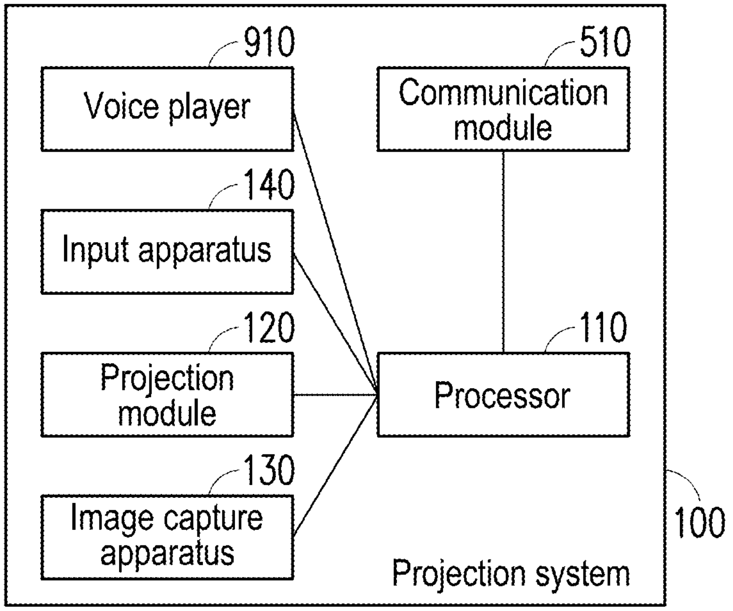
FIG. 9 is a block diagram of a projection system according to the sixth embodiment of the disclosure.

FIG. 9 is a block diagram of a projection system according to the sixth embodiment of the disclosure. In FIG. 9, a difference between the projection system 100 and the projection system 100 in FIG. 1 lies in that, the projection system 100 further includes a communication module 510 and a voice player 910 in addition to including a processor 110, a projection module 120, an image capture apparatus 130, and an input apparatus 140. The communication module 510 and the voice player 910 are coupled to the processor 110 respectively. After determining the display information corresponding to the target object, the processor 110 may further convert the display information into target voice information, and then drives the voice player 910 to play the target voice information. For example, when the projection module 120 projects an information image with display information, the voice player 910 may be driven to play the target voice information at the same time.

Figure 10:
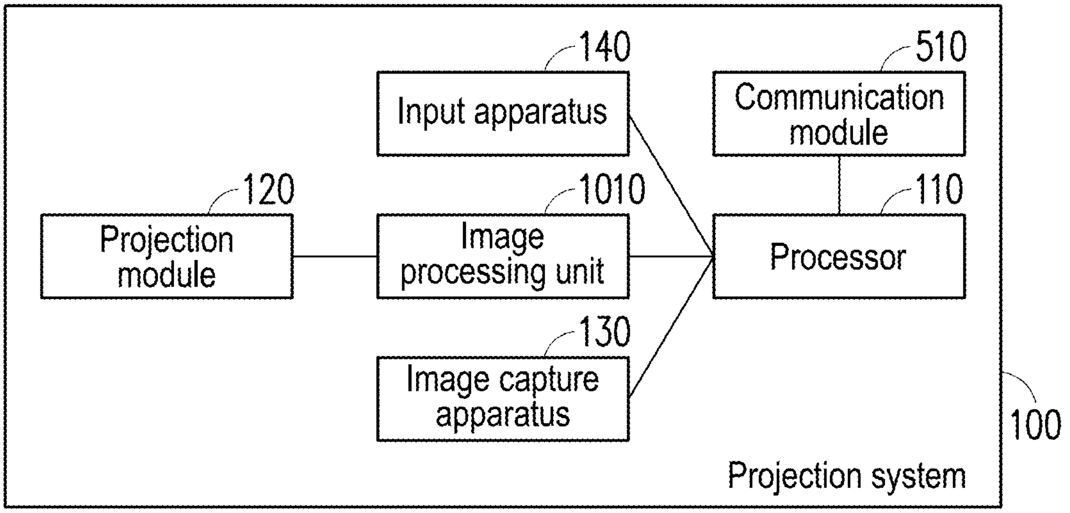
FIG. 10 is a block diagram of a projection system according to the seventh embodiment of the disclosure.

FIG. 10 is a block diagram of a projection system according to the seventh embodiment of the disclosure. In FIG. 10, a difference between the projection system 100 and the projection system 100 in FIG. 1 lies in that the projection system 100 further includes a communication module 510 and an image processing unit 1010 in addition to including a processor 110, a projection module 120, an image capture apparatus 130, and an input apparatus 140. The processor 110 is coupled to the communication module 510 and the image processing unit 1010 respectively. The image processing unit 1010 receives display information and a display position from the processor 110 to generate an information image, and transmits the information image to the projection module 120. The image processing unit 1010 may be, for example, a graphics processing unit (GPU).

In practical applications, each of the aforementioned projectors 500, 600, 700, and 800 may be operated in conjunction with an application (APP), or with an input apparatus 140 such as an infrared remote control apparatus or a portable smart device. For example, when the projector is activated, a virtual keyboard image may be projected by the projection module 120 driven by the APP stored inside the projector, or a virtual keyboard image is projected by the projection module 120 driven by operating the input apparatus 140. The input apparatus 140 selects buttons on the keyboard image to generate an input signal. After receiving the input signal, the processor 110 drives the image capture apparatus 130 to perform photographing.

To illustrate with an example where the input apparatus 110 includes an infrared remote control apparatus and a voice receiver, please refer to FIG. 1. A target object T (for example, an apple) (referring to FIG. 1) or a picture having the target object T (for example, a picture of stir-fried green peppers with shredded pork) is placed in a target environment space. The target environment space may also include, for example, a table configured to provide placement for the target object T. The target object T may be placed within the capture range R1 of the image capture apparatus 130. When the user presses a button on the infrared remote control apparatus or executes the APP installed on the projection system 100, a corresponding start signal is generated. The processor 110 activates the image capture apparatus 130 and the voice receiver (the input apparatus) according to the start signal. Suppose the user utters a voice message saying "Please tell me what this is", the voice receiver may transmit the received voice message as an input signal to the processor 110, and the processor 110 correspondingly drives and controls the image capture apparatus 130 to capture an image towards the capture range R1 (the target environment space) thereof.

The processor 110 generates an input command (a prompt to be input into the AI computation module 160) according to the input signal "Please tell me what this is". The processor 110 controls the image capture apparatus 130 to capture an image towards the capture range R1 thereof and generate a target captured image, and transmits the target captured image to the processor 110. Subsequently, the processor 110 transmits the target captured image and the input command (the prompt) to the cloud server 150 by the communication module 510. The AI computation module 160 of the cloud server 150 identifies the input command through a voice recognition function, while simultaneously recognizes the target image corresponding to the target object T of the target captured image through an image recognition function. The AI computation module 160 obtains an analysis result according to the target captured image and the input command, where the analysis result obtained by the AI computation module 160 may include target information such as the type, size, appearance, recipe, or nutritional value of the target object T. The analysis result may be in a text or voice format.

The cloud server 150 transmits the analysis result (for example, in the text format) back to the projection system 100, that is, the projection system 100 receives the analysis result from the cloud server 150 by the communication module 510. The processor 110 determines the display information and calculates the display position according to the analysis result, generates an information image, and drives the projection module 120 to project the information image. Additionally, in the embodiment of FIG. 10, the processor 110 may transmit the analysis result to the image processing unit 1010, so as to determine the display information and calculate the display position according to the analysis result by the image processing unit 1010, thereby generating an information image. Next, the image processing unit 1010 transmits the information image to the projection module 120, which projects to form an information image corresponding to the analysis result. The projected information image includes the target information 310 of the target object T (for example, the apple) as shown in FIG. 3. As shown in FIG. 3, the display position of the target information 310 on the information image 300 is around the target object T. That is, the target object 310 and the display information 310 on the projected information image 300 have an adjacent configuration relationship in the target environment space.

Additionally, the position of the display information to be presented on the information image may also be preset in advance for user viewing.

In other embodiments, it is not limited to only projecting the display information corresponding to the target object T by the projection module 120. As shown in FIG. 9, the target voice information may be generated by the processor 110 according to the analysis result and may be transmitted to the voice player 910 for playing. In another embodiment, after the processor 110 receives the analysis result, if a voice command from the user is received, for example, a voice command "please read aloud", the processor 110 transmits the input command corresponding to "please read aloud" to the AI computation module 160 of the cloud server 150 by the communication module 510 for computation. The cloud server 150 then provides an analysis result with semantic information to the processor 110, enabling the processor 110 to control the voice player 910 to play according to the semantic information in the analysis result.

In another embodiment, the user may also simultaneously say voice signals such as "please tell me what this is" and "please read aloud" as input signals. At this time, the processor 110 transmits the input commands corresponding to "please tell me what this is" and "please read aloud" to the AI computation module 160 of the cloud server 150 by the communication module 510 for AI computation and recognition. The cloud server 150 then provides an analysis result to the processor 110, where the analysis result includes the semantic information related to reading aloud, enabling the processor 110 to drive the projection module 120 to project an information image according to the analysis result, and also control the voice player 910 to play the target voice information.

In another embodiment, taking the input apparatus 110 including the infrared remote control apparatus and the voice receiver as an example, the target object T may also be a foreign language book or magazine that needs to be translated. The page that needs to be translated may be placed in the target environment space, which may include, for example, a table for providing a placement for the target object. The target object T may be placed within the capture range R1 (the target environment space) of the image capture apparatus 130. When the user presses a button on the infrared remote control apparatus or executes the APP installed on the projection system 100, the processor 110 activates the image capture apparatus 130 and the voice receiver. Suppose the user says a voice signal such as "please translate this book into Chinese", the voice receiver may transmit the received voice signal as an input signal to the processor 110, and the processor 110 drives and controls the image capture apparatus 130 to capture images towards the capture range R1 (the target environment space) thereof.

The processor 110 generates an input command (a prompt to be input to the AI computation module 160) according to the input signal "please translate this book into Chinese". The processor 110 controls the image capture apparatus 130 to capture the images towards the capture range R1 (the target environment space) thereof, generate a target captured image, and transmit the target captured image to the processor 110. Subsequently, the processor 110 transmits the target captured image and the input command (the prompt) to the cloud server 150 by the communication module 510. The AI computation module 160 of the cloud server 150 identifies the input command through the voice recognition function, and determines which language the text in the target image of the target captured image is through the image recognition function. Then, the AI computation module 160 determines that translation service is needed at this time, and transmits the analysis result (that is, the translated text) back to the projection system 100.

The processor 110 determines the display information and calculates the display position according to the analysis result, and generates an information image with translated text, and drives the projection module 120 to project the information image. The projected content includes the translated text, and the display position of the translated text on the information image may be around the book or magazine page.

Figure 11:
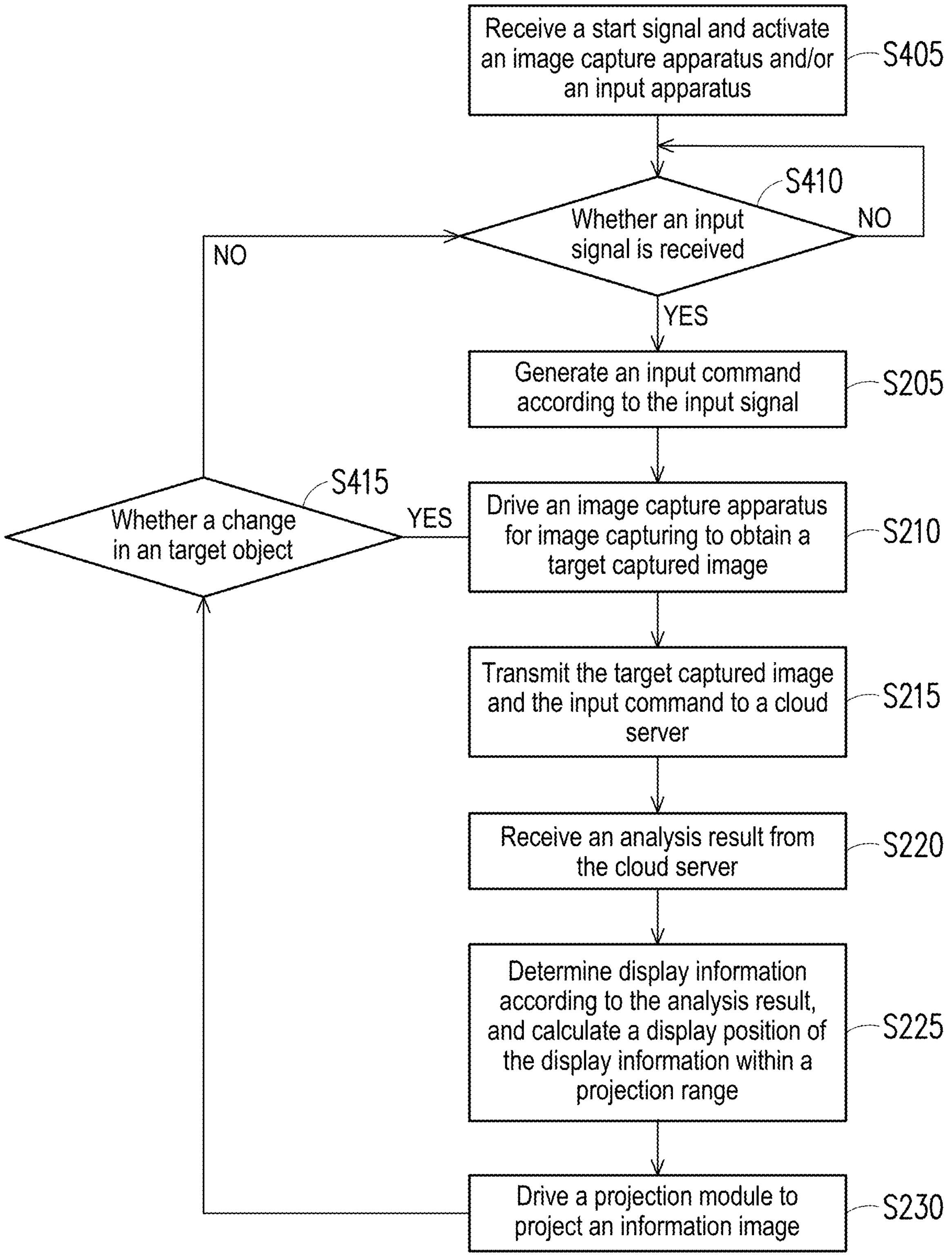
FIG. 11 is a flowchart of an overall operation of a projection system according to another embodiment of the disclosure.

FIG. 11 is a flowchart of an overall operation of a projection system according to another embodiment of the disclosure. This embodiment is based on an application example of Steps S205 to S230 in FIG. 2. In this embodiment, the processor 110 determines whether there is a change in the target object. With references to FIG. 1, FIG. 4, and FIG. 11, a difference between the process of this embodiment and the process of FIG. 4 lies in that after the information image is projected in Step S230, the process enters Step S415, where the processor 110 determines whether a change in the target object T is detected. If the determination is yes, the process proceeds to Step S210. If the determination is no, the process returns to before Step S410. The way the processor 110 determines whether there is a change in the target object T may be, for example, by a sensor detecting the user turning pages of a book or magazine, or detecting the user changing to another target object. The detector may be the image capture apparatus 130 or an infrared sensor, etc., but the disclosure is not limited to thereto. For example, after the user turns a page, the processor 110 determines that a change in the target object T, and drives the image capture apparatus 130 to capture the next page automatically, and transmits the currently obtained target captured image to the cloud server 150, so that the AI computation module 160 continuously updates and transmits back the translated text of the currently obtained target captured image, until the user says the voice command "stop translating" to end the translation function. The function of translating into Chinese text is just an example, that is, the function of translating into other languages may also be provided, and is not limited to thereto. Through the aforementioned process, the projection system of the disclosure may generate updated information images in real-time according to changes in the target object.

The aforementioned method of providing the voice command is just an example and is not limited to thereto. Any method that can receive user demand commands belongs to the concept that this disclosure intends to protect. For example, in other embodiments, the user may also provide the input signal to the processor 110 through text input. For instance, the projection module 120 may project the keyboard image with the key options, and the user may perform text input on the virtual keyboard image through, for example, the infrared remote control apparatus, and provide the input signal to the processor 110.

In summary, the disclosure combines the AI technology with the projection system, upgraded the smart home function of the projection system, and applies the technology to more venues and occasions. In the aforementioned embodiments, the projection system with the image capture apparatus and the projection module is coupled with the AI computation module located in the cloud to perform AI computation, identifies images or physical objects within the projection range of the projection module, and calculates information applicable to the target object at that moment and project the information in real-time around the object, which may be convenient for the user to view.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, adaptable for being communicatively connected to a cloud server, the cloud server having an artificial intelligence computation module, and the projection system comprising: a projection module, an input apparatus, a processor, and an image capture apparatus, wherein the processor is connected to the projection module, the image capture apparatus and the input apparatus, and is configured to:

receive at least one input signal from the input apparatus, and generate an input command according to the at least one input signal;

drive the image capture apparatus to capture an image towards a target environment space having a target object after receiving the at least one input signal to obtain a target captured image, wherein the target captured image comprises a target image corresponding to the target object;

transmit the target captured image and the input command to the cloud server after receiving the target captured image;

receive an analysis result from the cloud server, wherein the analysis result comprises target information corresponding to the target object, and the analysis result is generated by the artificial intelligence computation module according to the input command and the target image;

determine display information, and calculate a display position of the display information within a projection range according to the analysis result, wherein the display information comprises the target information; and drive the projection module to project an information image with the display information towards the target environment space.

2. The projection system according to claim 1, wherein the processor pre-stores a coordinate relationship between a capture range corresponding to the image capture apparatus and the projection range, and is configured to:

calculate a coordinate position of the target image of the target captured image within the projection range based on the coordinate relationship; and determine the display position of the display information within the projection range according to the coordinate position and the analysis result, wherein the target object and the display information on the projected information image have an adjacent configuration relationship in the target environment space.

3. The projection system according to claim 1, comprising a projector, the image capture apparatus being externally connected to the projector, the projector comprising the projection module, the processor and a communication module, and the communication module being respectively coupled to the processor, the input apparatus and the image capture apparatus, wherein the processor drives the image capture apparatus to perform image capturing by the communication module, receives the target captured image from the image capture apparatus by the communication module, and transmits the target captured image and the input command to the cloud server by the communication module.

4. The projection system according to claim 3, wherein the projector comprises the input apparatus, the input apparatus comprises a voice receiver, the voice receiver is configured to receive at least one voice message, and the at least one voice message is the at least one input signal.

5. The projection system according to claim 3, wherein the input apparatus is connected to the communication module of the projector in a wireless manner, the input apparatus is an infrared remote control apparatus, the infrared remote control apparatus is configured to transmit at least one infrared control signal to the communication module of the projector, and the at least one infrared control signal is the at least one input signal, wherein the processor is configured to:

drive the projection module to project a keyboard image having a plurality of buttons;

receive the at least one infrared control signal from the infrared remote control apparatus, wherein at least one key on the keyboard image is selected by the input apparatus to generate the at least one infrared control signal correspondingly;

generate a text content according to the at least one infrared control signal; and generate the input command according to the text content.

6. The projection system according to claim 3, wherein the input apparatus is connected to the communication module of the projector in a wireless manner, the input apparatus is a portable smart device, the portable smart device is configured to transmit at least one wireless control signal to the communication module of the projector, and the at least one wireless control signal is the at least one input signal.

7. The projection system according to claim 6, wherein the portable smart device comprises an application corresponding to the projector, the portable smart device correspondingly displays an input interface after the application is opened, and the at least one wireless control signal is generated correspondingly by executing an input operation on the input interface.

8. The projection system according to claim 1, comprising a projector, wherein the projector comprises the image capture apparatus, the projection module, the processor, and a communication module, and the communication module is respectively coupled to the processor and the input apparatus.

9. The projection system according to claim 8, wherein the projector comprises the input apparatus, the input apparatus comprises a voice receiver, the voice receiver is configured to receive at least one voice message, the at least one voice message is the at least one input signal, and the processor is configured to:

receive the at least one voice message from the voice receiver, and generate the input command according to the at least one voice message; and transmit the target captured image and the input command to the cloud server by the communication module.

10. The projection system according to claim 8, wherein the input apparatus is connected to the communication module of the projector in a wireless manner, the input apparatus is an infrared remote control apparatus, the infrared remote control apparatus is configured to transmit at least one infrared control signal to the communication module of the projector, and the at least one infrared control signal is the at least one input signal, wherein the processor is configured to:

drive the projection module to project a keyboard image having a plurality of key;

receive the at least one infrared control signal from the infrared remote control apparatus, wherein at least one key on the keyboard image is selected by the input apparatus to generate the at least one infrared control signal correspondingly;

generate a text content according to the at least one infrared control signal;

generate the input command according to the text content; and transmit the target captured image and the input command to the cloud server by the communication module.

11. The projection system according to claim 8, wherein the input apparatus is connected to the communication module of the projector in a wireless manner, the input apparatus is a portable smart device, the portable smart device is configured to transmit at least one wireless control signal to the communication module of the projector, and the at least one wireless control signal is the at least one input signal, wherein the processor is configured to:

receive the at least one wireless control signal from the portable smart device by the communication module; and transmit the target captured image and the input command to the cloud server by the communication module.

12. The projection system according to claim 11, wherein the portable smart device comprises an application corresponding to the projector, the portable smart device correspondingly displays an input interface after the application is opened, and the at least one wireless control signal is generated correspondingly by executing an input operation on the input interface.

13. The projection system according to claim 1, wherein the processor is configured to:

receive a start signal; and start the image capture apparatus and/or the input apparatus in response to the start signal.

14. The projection system according to claim 1, further comprising a voice player, coupled to the processor, wherein the processor is configured to:

convert the display information into target voice information, and drive the voice player to play the target voice information.

15. The projection system according to claim 1, wherein a capture range corresponding to the image capture apparatus and the projection range corresponding to the projection module partially or fully overlap.

16. The projection system according to claim 2, further comprising:

an image processing unit, coupled to the projection module and the processor respectively, wherein the image processing unit receives the display information and the display position from the processor to generate the information image, and transmits the information image to the projection module.

17. A projection method, applicable to a projection system and a cloud server communicatively connected to the projection system, the projection system comprising a projection module, an image capture apparatus, an input apparatus and a processor, the processor being connected to the projection module, the image capture apparatus, and the input apparatus, the cloud server having an artificial intelligence computation module, the projection method comprising executing following steps by the processor:

receiving at least one input signal from the input apparatus, and generating an input command according to the at least one input signal;

driving the image capture apparatus to perform image capturing towards a target environment space having a target object after receiving the at least one input signal to obtain a target captured image, wherein the target captured image comprises a target image corresponding to the target object;

transmitting the target captured image and the input command to the cloud server after receiving the target captured image;

receiving an analysis result from the cloud server, wherein the analysis result comprises target information corresponding to the target object, the analysis result is generated by the artificial intelligence computation module according to the input command and the target image;

determining display information according to the analysis result, and calculating a display position of the display information within a projection range, wherein the display information comprises the target information; and driving the projection module to project an information image with the display information towards the target environment space.

18. The projection method according to claim 17, wherein the processor pre-stores a coordinate relationship between a capture range corresponding to the image capture apparatus and the projection range, and the step of determining the display information according to the analysis result and calculating the display position of the display information within the projection range executed by the processor further comprises:

calculating a coordinate position of the target image in the target captured image within the projection range based on the coordinate relationship; and determining the display position of the display information in the projection range according to the coordinate position and the analysis result, wherein the at least one target object and the display information on the projected information image have an adjacent configuration relationship in the target environment space.

19. The projection method according to claim 17, wherein the projection system comprises a projector, the image capture apparatus is externally connected to the projector, the projector comprises the projection module, the processor, and a communication module, the communication module is respectively coupled to the processor, the input apparatus, and the image capture apparatus, wherein the processor drives the image capture apparatus to perform image capturing by the communication module, receives the target captured image from the image capture apparatus by the communication module, and transmits the target captured image and the input command to the cloud server by the communication module.

20. The projection method according to claim 19, wherein the projector comprises the input apparatus, the input apparatus comprises a voice receiver, the voice receiver is configured to receive at least one voice signal, and the at least one voice signal is the at least one input signal.

21. The projection method according to claim 19, wherein the input apparatus is connected to the communication module of the projector in a wireless manner, the input apparatus is an infrared remote control apparatus, the infrared remote control apparatus is configured to transmit at least one infrared control signal to the communication module of the projector, the at least one infrared control signal is the at least one input signal, and the step of receiving the at least one input signal from the input apparatus and generating the input command according to the at least one input signal executed by the processor further comprises:

driving the projection module to project a keyboard image having a plurality of buttons;

receiving the at least one infrared control signal from the infrared remote control apparatus, wherein at least one key on the keyboard image is selected by the input apparatus to generate the at least one infrared control signal correspondingly;

generating a text content according to the at least one infrared control signal; and generating the input command according to the text content.

22. The projection method according to claim 19, wherein the input apparatus is connected to the communication module of the projector in a wireless manner, the input apparatus is a portable smart device, the portable smart device is configured to transmit at least one wireless control signal to the communication module of the projector, and the at least one wireless control signal is the at least one input signal.

23. The projection method according to claim 22, wherein the portable smart device comprises an application corresponding to the projector, and the projection method further comprises following steps:

displaying an input interface correspondingly by the portable smart device after opening the application by the portable smart device; and executing an input operation on the input interface to generate the at least one wireless control signal correspondingly.

24. The projection method according to claim 17, wherein the projection system comprises a projector, the projector comprises the image capture apparatus, the projection module, the processor, and communication module, and the communication module is coupled to the processor and the input apparatus respectively, and transmits the target captured image and the input command to the cloud server by the communication module.

25. The projection method according to claim 24, wherein the projector comprises the input apparatus, the input apparatus comprises a voice receiver, the voice receiver is configured to receive at least one voice signal, and the at least one voice signal is the at least one input signal.

26. The projection method according to claim 24, wherein the input apparatus is connected to the communication module of the projector by wireless method, the input apparatus is an infrared remote control apparatus, the infrared remote control apparatus is configured to transmit at least one infrared control signal to the communication module of the projector, the at least one infrared control signal is the at least one input signal, and the step of receiving the at least one input signal from the input apparatus and generating the input command according to the at least one input signal executed by the processor further comprises:

driving the projection module to project a keyboard image having a plurality of buttons;

receiving the at least one infrared control signal from the infrared remote control apparatus, wherein at least one key on the keyboard image is selected by the input apparatus to generate the at least one infrared control signal correspondingly;

generating a text content according to the at least one infrared control signal; and generating the input command according to the text content.

27. The projection method according to claim 24, wherein the input apparatus is connected to the communication module of the projector in a wireless manner, the input apparatus is a portable smart device, the portable smart device is configured to send at least one wireless control signal to the communication module of the projector, and the at least one wireless control signal is the at least one input signal.

28. The projection method according to claim 27, wherein the portable smart device comprises an application corresponding to the projector, wherein the projection method further comprises following steps:

displaying an input interface correspondingly by the portable smart device after opening the application by the portable smart device; and executing an input operation on the input interface to generate the at least one wireless control signal correspondingly.

29. The projection method according to claim 17, further comprising executing following steps by the processor:

receiving a start signal; and starting the image capture apparatus and/or the input apparatus in response to the start signal.

30. The projection method according to claim 17, wherein the projection system further comprises a voice player, coupled to the processor, and the projection method further comprises executing following steps by the processor:

converting the display information into target voice information; and driving the voice player to play the target voice information.

31. The projection method according to claim 17, wherein a capture range corresponding to the image capture apparatus and the projection range corresponding to the projection module partially or fully overlap.

32. The projection system according to claim 18, further comprising: an image processing unit, coupled to the projection module and the processor respectively, wherein the image processing unit receives the display information and the display position from the processor to generate the information image, and transmits the information image to the projection module.

* * * * *